US012661713B2

(12) United States Patent
Song

(10) Patent No.: US 12,661,713 B2
(45) Date of Patent: Jun. 23, 2026

(54) WIRE-FEED FRICTION STIR ADDITIVE MANUFACTURING DEVICES AND METHODS

(71) Applicant: Blue Origin Manufacturing, LLC, Huntsville, AL (US)

(72) Inventor: Weidong Song, Woodinville, WA (US)

(73) Assignee: Blue Origin Manufacturing, LLC, Huntsville, AL (US)

( * ) Notice: Subject to any disclaimer, the term of this patent is extended or adjusted under 35 U.S.C. 154(b) by 0 days.

(21) Appl. No.: 18/830,274

(22) Filed: Sep. 10, 2024

(65) Prior Publication Data

US 2026/0070128 A1    Mar. 12, 2026

(51) Int. Cl.
| | |
|---|---|
| *B22F 10/22* | (2021.01) |
| *B22F 12/50* | (2021.01) |
| *B23K 20/12* | (2006.01) |
| *B33Y 10/00* | (2015.01) |
| *B33Y 30/00* | (2015.01) |

(52) U.S. Cl.
CPC .............. *B22F 12/50* (2021.01); *B22F 10/22* (2021.01); *B33Y 10/00* (2014.12); *B33Y 30/00* (2014.12)

(58) Field of Classification Search
None
See application file for complete search history.

(56) References Cited

U.S. PATENT DOCUMENTS

| | | |
|---|---|---|
| 2,941,759 A | 6/1960 | Rice et al. |
| 3,069,847 A | 12/1962 | Vest, Jr. |

| | | | | |
|---|---|---|---|---|
| 3,414,699 A | | 12/1968 | Albert et al. | |
| 3,585,800 A | | 6/1971 | Kuntz | |
| 3,737,976 A | | 6/1973 | Lieberman et al. | |
| 3,875,364 A | | 4/1975 | Boyett | |
| 3,924,092 A | * | 12/1975 | Lessmann ............ | B23K 9/0737 219/76.11 |

(Continued)

FOREIGN PATENT DOCUMENTS

| | | |
|---|---|---|
| AU | 2014274824 A1 | 12/2015 |
| AU | 2018359514 B2 | 10/2018 |

(Continued)

OTHER PUBLICATIONS

Bobbin Tool Friction Stir Welding Developed, TWI-Global.com, 3 pages, date accessed Nov. 5, 2024.

(Continued)

*Primary Examiner* — Devang R Patel
(74) *Attorney, Agent, or Firm* — Knobbe, Martens, Olson & Bear, LLP

(57) ABSTRACT

A friction stir additive manufacturing system is provided. In one aspect, the system includes a spindle configured to rotate about a central axis. The spindle includes a plurality of spindle channels extending from a first end of the spindle to a second end of the spindle. The system also includes a plurality of sleeves, each of the sleeves configured to be received within a corresponding spindle channel. Each of the sleeves includes a hollow interior. The system also includes a plurality of wires. The system also includes a feeding system configured to feed each of the plurality of wires through a respective sleeve or the plurality of sleeves as the spindle rotates. The plurality of wires are configured to soften as they are fed through the plurality of sleeves and the spindle rotates.

6 Claims, 6 Drawing Sheets

(56) References Cited

U.S. PATENT DOCUMENTS

| | | | |
|---|---|---|---|
| 4,000,074 A | 12/1976 | Evans | |
| 4,364,067 A | 12/1982 | Koto et al. | |
| 4,436,977 A | 3/1984 | Cash et al. | |
| 5,155,330 A * | 10/1992 | Fratiello | B23K 9/295 |
| | | | 219/137 R |
| 5,233,755 A | 8/1993 | Vandendriessche | |
| 5,393,949 A | 2/1995 | Stircklen | |
| 5,697,511 A | 12/1997 | Bampton | |
| 5,714,735 A * | 2/1998 | Offer | B23K 9/1336 |
| | | | 219/136 |
| 5,780,804 A | 7/1998 | White et al. | |
| 5,971,252 A | 10/1999 | Rosen et al. | |
| 6,050,474 A | 4/2000 | Aota et al. | |
| 6,050,475 A | 4/2000 | Kinton et al. | |
| 6,151,887 A | 11/2000 | Hadin | |
| 6,536,651 B2 | 3/2003 | Ezumi et al. | |
| 6,543,671 B2 | 4/2003 | Hatten et al. | |
| 6,606,851 B1 | 8/2003 | Herdy, Jr. | |
| 6,669,075 B2 | 12/2003 | Colligan | |
| 6,779,707 B2 | 8/2004 | Dracup et al. | |
| 7,090,112 B2 | 8/2006 | Masingale | |
| 7,093,470 B2 | 8/2006 | El-Soudani | |
| 7,097,091 B2 | 8/2006 | Okamura et al. | |
| 7,128,532 B2 | 10/2006 | Petervary | |
| 7,354,657 B2 | 4/2008 | Mishra | |
| 7,430,888 B2 | 10/2008 | Osame | |
| 7,525,067 B2 * | 4/2009 | Diez | B23K 9/125 |
| | | | 219/137 R |
| 7,556,187 B2 | 7/2009 | Sunahara et al. | |
| 7,735,223 B2 | 6/2010 | Clark | |
| 7,748,592 B2 | 7/2010 | Koga et al. | |
| 7,828,191 B2 | 11/2010 | Ohashi et al. | |
| 7,832,613 B2 | 11/2010 | Hanlon et al. | |
| 7,854,958 B2 | 12/2010 | Kramer | |
| 7,866,532 B1 | 1/2011 | Potter et al. | |
| 8,002,168 B2 | 8/2011 | Boman | |
| 8,079,126 B2 | 12/2011 | Bampton et al. | |
| 8,114,474 B1 | 2/2012 | Dudt et al. | |
| 8,141,764 B1 | 3/2012 | Potter et al. | |
| 8,272,424 B2 | 9/2012 | Short | |
| 8,316,916 B2 | 11/2012 | Heinrich et al. | |
| 8,348,136 B1 | 1/2013 | Potter et al. | |
| 8,397,974 B2 | 3/2013 | Schultz et al. | |
| 8,399,792 B2 * | 3/2013 | Peters | B23K 9/04 |
| | | | 219/76.1 |
| 8,632,850 B2 | 1/2014 | Schultz et al. | |
| 8,636,194 B2 * | 1/2014 | Schultz | B23K 20/1225 |
| | | | 228/2.1 |
| 8,710,144 B2 | 4/2014 | Hesse et al. | |
| 8,782,892 B2 | 7/2014 | Seo et al. | |
| 8,875,976 B2 | 11/2014 | Schultz et al. | |
| 8,893,954 B2 | 11/2014 | Schultz et al. | |
| 8,998,064 B2 | 4/2015 | Russell et al. | |
| 9,027,378 B2 | 5/2015 | Crump et al. | |
| 9,050,688 B2 | 6/2015 | Yamaguchi et al. | |
| 9,090,950 B2 | 7/2015 | Hales et al. | |
| 9,101,979 B2 | 8/2015 | Hofmann et al. | |
| 9,126,367 B1 | 9/2015 | Mark et al. | |
| 9,205,578 B2 | 12/2015 | Schultz et al. | |
| 9,233,438 B2 | 1/2016 | Phelan et al. | |
| 9,238,283 B2 | 1/2016 | Gniesmer | |
| 9,266,191 B2 | 2/2016 | Kandasamy et al. | |
| 9,511,445 B2 | 12/2016 | Kandasamy | |
| 9,511,446 B2 | 12/2016 | Kandasamy et al. | |
| 9,555,580 B1 | 1/2017 | Dykstra et al. | |
| 9,555,871 B2 | 1/2017 | Grip et al. | |
| 9,610,650 B2 | 4/2017 | Hofmann et al. | |
| 9,611,803 B2 | 4/2017 | Vieira De Morais et al. | |
| 9,643,279 B2 | 5/2017 | Schultz et al. | |
| 9,757,802 B2 | 9/2017 | Cui et al. | |
| 9,862,054 B2 | 1/2018 | Kandasamy et al. | |
| 9,931,789 B2 | 4/2018 | Wiesner et al. | |
| 9,937,587 B2 | 4/2018 | Kou et al. | |
| 9,943,929 B2 | 4/2018 | Schultz et al. | |
| 9,962,787 B2 | 5/2018 | Sugimoto et al. | |
| 10,011,089 B2 | 7/2018 | Lyons et al. | |
| 10,022,796 B2 | 7/2018 | Wang | |
| 10,105,790 B2 | 10/2018 | Kandasamy | |
| 10,254,499 B1 | 4/2019 | Cohen et al. | |
| 10,259,041 B2 | 4/2019 | Gessler et al. | |
| 10,279,422 B2 | 5/2019 | Werz et al. | |
| 10,335,854 B2 | 7/2019 | Wiesner et al. | |
| 10,500,674 B2 | 12/2019 | Kandasamy et al. | |
| 10,543,529 B2 | 1/2020 | Schwarze et al. | |
| 10,583,519 B2 | 3/2020 | Litwinski | |
| 10,583,631 B2 | 3/2020 | Kandasamy et al. | |
| 10,625,374 B2 | 4/2020 | Schwarze | |
| 10,661,379 B1 | 5/2020 | Larsson et al. | |
| 10,670,019 B2 | 6/2020 | Zinniel et al. | |
| 10,688,588 B2 * | 6/2020 | Twelves, Jr. | B33Y 10/00 |
| 10,724,561 B2 | 7/2020 | Amira et al. | |
| 10,773,335 B2 * | 9/2020 | Weeks | B23K 9/0017 |
| 10,796,727 B1 | 10/2020 | Coffey et al. | |
| 10,857,596 B1 | 12/2020 | Mittendorf et al. | |
| 10,889,098 B2 | 1/2021 | Yamazaki et al. | |
| 10,906,127 B2 | 2/2021 | Seo et al. | |
| 10,953,489 B2 | 3/2021 | Fröhlke et al. | |
| 10,987,754 B1 * | 4/2021 | Eller | B23K 20/1255 |
| 11,014,292 B2 | 5/2021 | Marchione | |
| 11,077,607 B2 | 8/2021 | Snyder et al. | |
| 11,117,213 B2 * | 9/2021 | Rodriguez | B23K 20/22 |
| 11,219,951 B2 | 1/2022 | Matthews et al. | |
| 11,229,972 B2 | 1/2022 | Mosaki et al. | |
| 11,260,468 B2 | 3/2022 | Frank et al. | |
| 11,305,375 B2 | 4/2022 | Landmark | |
| 11,311,959 B2 | 4/2022 | Hardwick et al. | |
| 11,352,120 B2 | 6/2022 | Rathey et al. | |
| 11,370,058 B2 * | 6/2022 | Rodriguez | B33Y 40/00 |
| 11,415,380 B2 | 8/2022 | Chipko et al. | |
| 11,549,157 B2 | 1/2023 | Singh et al. | |
| 11,578,395 B2 | 2/2023 | Hales et al. | |
| 11,772,188 B1 | 10/2023 | Sargent | |
| 11,845,141 B2 * | 12/2023 | Senderos | B23K 20/122 |
| 11,981,460 B2 | 5/2024 | Muceus et al. | |
| 12,140,109 B2 | 11/2024 | Song et al. | |
| 12,209,559 B2 | 1/2025 | Song et al. | |
| 12,246,392 B2 | 3/2025 | Song et al. | |
| 12,303,994 B2 | 5/2025 | Bailey et al. | |
| 12,383,975 B2 | 8/2025 | Song | |
| 2002/0014070 A1 | 2/2002 | Stechman, Jr. et al. | |
| 2003/0042292 A1 | 3/2003 | Hatten et al. | |
| 2003/0057258 A1 | 3/2003 | Ishida et al. | |
| 2003/0098335 A1 | 5/2003 | Saeki et al. | |
| 2003/0126856 A1 | 7/2003 | Lair | |
| 2003/0192941 A1 | 10/2003 | Ishida et al. | |
| 2004/0060965 A1 | 4/2004 | Mishra | |
| 2004/0074949 A1 | 4/2004 | Narita et al. | |
| 2004/0107019 A1 | 6/2004 | Keshovmurthy et al. | |
| 2004/0155094 A1 | 8/2004 | Okamoto et al. | |
| 2005/0035173 A1 | 2/2005 | Steel et al. | |
| 2005/0045694 A1 | 3/2005 | Subramanian et al. | |
| 2005/0242158 A1 | 11/2005 | Bolser | |
| 2005/0279810 A1 | 12/2005 | Stol et al. | |
| 2006/0086707 A1 | 4/2006 | Kou et al. | |
| 2006/0102699 A1 | 5/2006 | Burton et al. | |
| 2006/0169741 A1 | 8/2006 | Smith et al. | |
| 2006/0289604 A1 | 12/2006 | Zettler et al. | |
| 2007/0152015 A1 | 7/2007 | Burton et al. | |
| 2007/0158343 A1 | 7/2007 | Shimada et al. | |
| 2007/0194051 A1 | 8/2007 | Bakken et al. | |
| 2007/0199978 A1 | 8/2007 | Ezumi | |
| 2007/0228104 A1 | 10/2007 | Mankus et al. | |
| 2008/0096038 A1 | 4/2008 | Nagano | |
| 2008/0128473 A1 | 6/2008 | Zhou et al. | |
| 2009/0090700 A1 | 4/2009 | Sato et al. | |
| 2009/0166395 A1 | 7/2009 | Nakata et al. | |
| 2009/0188109 A1 | 7/2009 | Bampton et al. | |
| 2010/0084437 A1 | 4/2010 | Biggs et al. | |
| 2010/0140321 A1 | 6/2010 | Eller et al. | |
| 2010/0167083 A1 | 7/2010 | Park et al. | |
| 2010/0176182 A1 | 7/2010 | Hanlon et al. | |
| 2010/0242843 A1 | 9/2010 | Peretti et al. | |
| 2010/0252169 A1 | 10/2010 | Feng et al. | |

(56) References Cited

U.S. PATENT DOCUMENTS

| | | |
|---|---|---|
| 2010/0285207 A1 | 11/2010 | Creehan et al. |
| 2011/0062219 A1 | 3/2011 | Bezaire et al. |
| 2011/0262695 A1 | 10/2011 | Lee et al. |
| 2011/0266330 A1 | 11/2011 | Bruck et al. |
| 2011/0315367 A1 | 12/2011 | Romero et al. |
| 2012/0009339 A1 | 1/2012 | Creehan et al. |
| 2012/0058359 A1 | 3/2012 | Kingston et al. |
| 2012/0073732 A1 | 3/2012 | Perlman |
| 2012/0114861 A1 | 5/2012 | Cohen et al. |
| 2012/0273555 A1 | 11/2012 | Flak et al. |
| 2012/0279441 A1 | 11/2012 | Creehan et al. |
| 2012/0279442 A1 | 11/2012 | Creehan et al. |
| 2013/0056912 A1 | 3/2013 | O'neill et al. |
| 2013/0068825 A1 | 3/2013 | Rosal et al. |
| 2013/0221069 A1 | 8/2013 | Saito et al. |
| 2014/0130736 A1 | 5/2014 | Schultz et al. |
| 2014/0134325 A1 | 5/2014 | Schultz et al. |
| 2014/0138332 A1 | 5/2014 | Loree |
| 2014/0165399 A1 | 6/2014 | Seo et al. |
| 2014/0174344 A1 | 6/2014 | Scuhltz et al. |
| 2014/0174361 A1 | 6/2014 | Hanlon et al. |
| 2014/0183245 A1 | 7/2014 | Yamaguchi et al. |
| 2014/0274726 A1 | 9/2014 | Sugimoto et al. |
| 2015/0079306 A1 | 3/2015 | Schoeneborn et al. |
| 2015/0165546 A1 | 6/2015 | Kandasamy et al. |
| 2015/0274280 A1 | 10/2015 | Sheahan, Jr. |
| 2015/0321289 A1 | 11/2015 | Bruck et al. |
| 2016/0074958 A1 | 3/2016 | Kandasamy et al. |
| 2016/0075059 A1 | 3/2016 | Williams |
| 2016/0090848 A1 | 3/2016 | Engeli et al. |
| 2016/0107262 A1 | 4/2016 | Schultz et al. |
| 2016/0169012 A1 | 6/2016 | Dacunha et al. |
| 2016/0175981 A1 | 6/2016 | Kandasamy et al. |
| 2016/0175982 A1 | 6/2016 | Kandasamy et al. |
| 2016/0193689 A1 | 7/2016 | Sugimoto et al. |
| 2016/0221117 A1 | 8/2016 | Taniguchi et al. |
| 2016/0258298 A1 | 9/2016 | Channel et al. |
| 2016/0363390 A1 | 12/2016 | Karlen et al. |
| 2017/0022615 A1 | 1/2017 | Arndt et al. |
| 2017/0043429 A1 | 2/2017 | Kandasamy et al. |
| 2017/0057204 A1 | 3/2017 | Kandasamy et al. |
| 2017/0080519 A1 | 3/2017 | Atin et al. |
| 2017/0150602 A1 | 5/2017 | Johnston et al. |
| 2017/0197274 A1 | 7/2017 | Steel et al. |
| 2017/0216962 A1 | 8/2017 | Schultz et al. |
| 2017/0284206 A1 | 10/2017 | Reberts et al. |
| 2017/0291221 A1 | 10/2017 | Swank et al. |
| 2017/0299120 A1 | 10/2017 | Stachulla et al. |
| 2017/0312850 A1 | 11/2017 | Werz et al. |
| 2018/0047645 A1 | 2/2018 | Varadarajan et al. |
| 2018/0085849 A1 | 3/2018 | Kandasamy et al. |
| 2018/0126636 A1 | 5/2018 | Jang |
| 2018/0257141 A1 | 9/2018 | Hofmann et al. |
| 2018/0296343 A1 | 10/2018 | Wei |
| 2018/0311899 A1* | 11/2018 | Titchener ............... B33Y 40/00 |
| 2018/0361501 A1 | 12/2018 | Hardwick et al. |
| 2019/0054534 A1 | 2/2019 | Norton et al. |
| 2019/0168304 A1 | 6/2019 | Krol et al. |
| 2019/0193194 A1 | 6/2019 | Grong et al. |
| 2019/0210152 A1 | 7/2019 | Konitzer |
| 2019/0217508 A1 | 7/2019 | McGinnis et al. |
| 2019/0299290 A1 | 10/2019 | Kuhns et al. |
| 2019/0388128 A1 | 12/2019 | Wilson et al. |
| 2020/0016687 A1 | 1/2020 | Whalen et al. |
| 2020/0047279 A1 | 2/2020 | Misak |
| 2020/0063242 A1 | 2/2020 | Angels |
| 2020/0101559 A1 | 4/2020 | Rose et al. |
| 2020/0180297 A1 | 6/2020 | Carter et al. |
| 2020/0189025 A1* | 6/2020 | Rodriguez ............. B23K 20/22 |
| 2020/0198046 A1 | 6/2020 | Imaizumi et al. |
| 2020/0209107 A1 | 7/2020 | Ream et al. |
| 2020/0238609 A1* | 7/2020 | Stranberg ............... B29C 64/118 |
| 2020/0247058 A1 | 8/2020 | Flitsch et al. |
| 2020/0262001 A1 | 8/2020 | Uetani |
| 2020/0290127 A1 | 9/2020 | Berglund et al. |
| 2020/0306869 A1 | 10/2020 | Hardwick et al. |
| 2020/0332421 A1 | 10/2020 | Jahdie et al. |
| 2020/0338639 A1 | 10/2020 | Friesth |
| 2021/0008658 A1 | 1/2021 | Frank et al. |
| 2021/0046579 A1* | 2/2021 | Rodriguez ............. B33Y 30/00 |
| 2021/0048053 A1 | 2/2021 | Ahn |
| 2021/0053283 A1 | 2/2021 | Liu et al. |
| 2021/0069778 A1 | 3/2021 | Redding et al. |
| 2021/0078258 A1 | 3/2021 | Lalande et al. |
| 2021/0146471 A1* | 5/2021 | Rodriguez ........... B23K 20/128 |
| 2021/0180165 A1 | 6/2021 | Pasebani et al. |
| 2021/0245293 A1 | 8/2021 | Hardwick et al. |
| 2021/0308937 A1 | 10/2021 | Broach et al. |
| 2021/0379664 A1 | 12/2021 | Gibson et al. |
| 2021/0387253 A1 | 12/2021 | Schweizer et al. |
| 2022/0016834 A1 | 1/2022 | West |
| 2022/0023821 A1 | 1/2022 | Aimone et al. |
| 2022/0049331 A1 | 2/2022 | Angels |
| 2022/0080522 A1 | 3/2022 | Cox et al. |
| 2022/0088681 A1 | 3/2022 | Chehab |
| 2022/0176451 A1 | 6/2022 | Schweizer et al. |
| 2022/0176633 A1* | 6/2022 | Hardwick ............... B22F 12/88 |
| 2022/0281005 A1 | 9/2022 | Kandasamy |
| 2022/0388091 A1 | 12/2022 | Norman et al. |
| 2022/0389543 A1 | 12/2022 | Chehab |
| 2023/0146110 A1* | 5/2023 | Allison .................. B33Y 30/00 |
| | | 228/112.1 |
| 2023/0150052 A1 | 5/2023 | Haynes |
| 2023/0356322 A1 | 11/2023 | Haynie et al. |
| 2024/0100624 A1 | 3/2024 | Hardwick et al. |
| 2024/0109245 A1 | 4/2024 | Lalande et al. |
| 2024/0149373 A1 | 5/2024 | Munn et al. |
| 2024/0173791 A1 | 5/2024 | Brendel et al. |
| 2024/0326155 A1 | 10/2024 | Song |
| 2024/0326156 A1 | 10/2024 | Song et al. |
| 2024/0328373 A1 | 10/2024 | Song et al. |
| 2024/0328374 A1 | 10/2024 | Song et al. |
| 2025/0035071 A1 | 1/2025 | Song et al. |
| 2025/0041963 A1 | 2/2025 | Song |
| 2025/0041964 A1 | 2/2025 | Bailey et al. |
| 2025/0135574 A1 | 5/2025 | Song |
| 2025/0153267 A1 | 5/2025 | Hartley et al. |
| 2025/0162063 A1 | 5/2025 | Bailey et al. |
| 2025/0163869 A1 | 5/2025 | Song et al. |
| 2025/0187104 A1 | 6/2025 | Song et al. |
| 2025/0187105 A1 | 6/2025 | Song et al. |
| 2025/0187106 A1 | 6/2025 | Song et al. |
| 2025/0187107 A1 | 6/2025 | Song et al. |
| 2025/0187108 A1 | 6/2025 | Song |
| 2025/0196438 A1 | 6/2025 | Hartley et al. |
| 2025/0242431 A1 | 7/2025 | Song et al. |

FOREIGN PATENT DOCUMENTS

| | | |
|---|---|---|
| AU | 2018359514 A1 | 5/2019 |
| AU | 2019234726 A1 | 9/2019 |
| AU | 2019290657 A1 | 12/2019 |
| AU | 2019338384 A1 | 3/2020 |
| AU | 2019383418 A1 | 5/2020 |
| AU | 2018359514 C1 | 5/2021 |
| CA | 2569350 A1 | 5/2007 |
| CA | 2569773 C | 4/2013 |
| CA | 3081330 A1 | 10/2018 |
| CA | 3093812 A1 | 3/2019 |
| CA | 3104289 A1 | 6/2019 |
| CA | 3112446 A1 | 9/2019 |
| CA | 3120796 A1 | 11/2019 |
| CN | 101629290 A | 1/2010 |
| CN | 101657289 A | 2/2010 |
| CN | 101537538 B | 1/2011 |
| CN | 101537539 B | 1/2011 |
| CN | 102069172 A | 5/2011 |
| CN | 101406987 B | 3/2012 |
| CN | 203843367 U | 9/2014 |
| CN | 109202271 A | 1/2015 |
| CN | 104439686 A | 3/2015 |
| CN | 103639668 B | 12/2015 |
| CN | 105290608 A | 2/2016 |
| CN | 105750725 A | 7/2016 |

(56) References Cited

FOREIGN PATENT DOCUMENTS

| | | | |
|---|---|---|---|
| CN | 103978304 | B | 9/2016 |
| CN | 105965152 | A | 9/2016 |
| CN | 106001905 | A | 10/2016 |
| CN | 106735851 | A | 5/2017 |
| CN | 107030371 | A | 8/2017 |
| CN | 206366652 | U | 8/2017 |
| CN | 107160029 | B | 9/2017 |
| CN | 107160030 | A | 9/2017 |
| CN | 107160109 | A | 9/2017 |
| CN | 107414281 | A | 12/2017 |
| CN | 107498175 | A | 12/2017 |
| CN | 206925453 | U | 1/2018 |
| CN | 107813044 | A | 3/2018 |
| CN | 107841744 | A | 3/2018 |
| CN | 108372359 | A | 8/2018 |
| CN | 108385101 | A | 8/2018 |
| CN | 108838509 | A | 11/2018 |
| CN | 109202273 | A | 1/2019 |
| CN | 109261940 | A | 1/2019 |
| CN | 107584122 | B | 2/2019 |
| CN | 107116366 | B | 3/2019 |
| CN | 109940524 | A | 6/2019 |
| CN | 110042385 | A | 7/2019 |
| CN | 209272731 | U | 8/2019 |
| CN | 110653618 | A | 1/2020 |
| CN | 107900510 | B | 2/2020 |
| CN | 110834179 | A | 2/2020 |
| CN | 111331246 | A | 2/2020 |
| CN | 110933791 | A | 3/2020 |
| CN | 109878084 | B | 6/2020 |
| CN | 108971742 | B | 7/2020 |
| CN | 109202273 | B | 9/2020 |
| CN | 111655403 | A | 9/2020 |
| CN | 211464825 | U | 9/2020 |
| CN | 109202275 | B | 10/2020 |
| CN | 111761198 | A | 10/2020 |
| CN | 108603504 | B | 11/2020 |
| CN | 109940163 | B | 12/2020 |
| CN | 112108756 | A | 12/2020 |
| CN | 108930034 | B | 1/2021 |
| CN | 112207414 | A | 1/2021 |
| CN | 109202272 | B | 2/2021 |
| CN | 109570934 | B | 2/2021 |
| CN | 112355463 | A | 2/2021 |
| CN | 112404453 | A | 2/2021 |
| CN | 109967860 | B | 3/2021 |
| CN | 112496522 | A | 3/2021 |
| CN | 110640294 | B | 4/2021 |
| CN | 112658460 | A | 4/2021 |
| CN | 109570933 | B | 5/2021 |
| CN | 112770884 | A | 5/2021 |
| CN | 112828441 | A | 5/2021 |
| CN | 110102871 | B | 6/2021 |
| CN | 112958902 | A | 6/2021 |
| CN | 113001007 | A | 6/2021 |
| CN | 113020625 | A | 6/2021 |
| CN | 113172331 | A | 7/2021 |
| CN | 111531266 | B | 8/2021 |
| CN | 214212574 | U | 9/2021 |
| CN | 111230282 | B | 10/2021 |
| CN | 113523534 | A | 10/2021 |
| CN | 113695573 | A | 11/2021 |
| CN | 113695593 | A | 11/2021 |
| CN | 113828907 | A | 12/2021 |
| CN | 113857643 | A | 12/2021 |
| CN | 214977765 | U | 12/2021 |
| CN | 111055007 | B | 1/2022 |
| CN | 215468782 | U | 1/2022 |
| CN | 114131176 | A | 3/2022 |
| CN | 217096135 | U | 3/2022 |
| CN | 113172331 | B | 4/2022 |
| CN | 114393292 | A | 4/2022 |
| CN | 111575698 | B | 5/2022 |
| CN | 111575699 | B | 5/2022 |
| CN | 113146021 | B | 6/2022 |
| CN | 114669858 | A | 6/2022 |
| CN | 216780643 | U | 6/2022 |
| CN | 111872543 | B | 7/2022 |
| CN | 112025074 | B | 7/2022 |
| CN | 113118612 | B | 7/2022 |
| CN | 113351984 | B | 7/2022 |
| CN | 114770784 | A | 7/2022 |
| CN | 114799201 | A | 7/2022 |
| CN | 114799480 | A | 7/2022 |
| CN | 112407338 | B | 8/2022 |
| CN | 113001005 | B | 8/2022 |
| CN | 114833439 | A | 8/2022 |
| CN | 114951954 | A | 8/2022 |
| CN | 115055699 | A | 9/2022 |
| CN | 115091022 | A | 9/2022 |
| CN | 115156523 | A | 10/2022 |
| CN | 115178855 | A | 10/2022 |
| CN | 115351514 | A | 11/2022 |
| CN | 217729675 | U | 11/2022 |
| CN | 115502543 | A | 12/2022 |
| CN | 115555700 | A | 1/2023 |
| CN | 115673528 | A | 2/2023 |
| CN | 115091025 | B | 3/2023 |
| CN | 115740727 | A | 3/2023 |
| CN | 218694877 | U | 3/2023 |
| CN | 113927151 | B | 4/2023 |
| CN | 114769922 | B | 4/2023 |
| CN | 218799795 | U | 4/2023 |
| CN | 218799797 | U | 4/2023 |
| CN | 218799801 | U | 4/2023 |
| CN | 116038093 | A | 5/2023 |
| CN | 116140783 | A | 5/2023 |
| CN | 116160108 | A | 5/2023 |
| CN | 115106641 | B | 6/2023 |
| CN | 115740726 | B | 6/2023 |
| CN | 116423033 | A | 7/2023 |
| CN | 116475558 | A | 7/2023 |
| CN | 219336363 | U | 7/2023 |
| CN | 219336364 | U | 7/2023 |
| CN | 219379326 | U | 7/2023 |
| CN | 116511543 | A | 8/2023 |
| CN | 116571769 | A | 8/2023 |
| CN | 116618816 | A | 8/2023 |
| CN | 115673526 | B | 9/2023 |
| CN | 116900465 | A | 10/2023 |
| CN | 116900467 | A | 10/2023 |
| CN | 116921840 | A | 10/2023 |
| CN | 116926531 | A | 10/2023 |
| CN | 220050404 | U | 11/2023 |
| CN | 117340415 | A | 1/2024 |
| CN | 117428313 | A | 1/2024 |
| CN | 220591878 | U | 3/2024 |
| CN | 117817098 | A | 4/2024 |
| CN | 117943678 | A | 4/2024 |
| DE | 19948441 | A1 | 4/2001 |
| DE | 202015002830 | U1 | 4/2015 |
| DE | 102014115535 | B3 | 3/2016 |
| DE | 102015216802 | A1 | 3/2017 |
| DE | 102016113289 | A1 | 1/2018 |
| DE | 102019106873 | A1 | 9/2020 |
| DE | 102019007902 | A1 | 5/2021 |
| EP | 1206995 | A2 | 5/2002 |
| EP | 1413384 | A2 | 4/2004 |
| EP | 3251768 | A1 | 12/2017 |
| EP | 3703888 | A1 | 10/2018 |
| EP | 4129552 | A1 | 2/2023 |
| FR | 3135002 | A1 | 11/2023 |
| FR | 3139018 | A1 | 3/2024 |
| GB | 2306366 | A | 5/1997 |
| GB | 2576260 | B | 2/2020 |
| GB | 2614889 | A | 7/2023 |
| IN | 2023/31035542 | A | 9/2023 |
| JP | H 1147960 | A | 2/1999 |
| JP | H 11156561 | A | 6/1999 |
| JP | 2000094159 | A | 4/2000 |
| JP | 20000334577 | A | 12/2000 |
| JP | 2003-322135 | A | 11/2003 |
| JP | 2004025296 | A | 1/2004 |
| JP | 3563003 | B2 | 9/2004 |

(56) References Cited

FOREIGN PATENT DOCUMENTS

| | | | |
|---|---|---|---|
| JP | 2004261859 A | 9/2004 |
| JP | 2004-311640 A | 11/2004 |
| JP | 2005-171299 A | 6/2005 |
| JP | 2007-061875 A | 3/2007 |
| JP | 2009006396 A | 1/2009 |
| JP | 2009-090295 A | 4/2009 |
| JP | 4299266 B2 | 7/2009 |
| JP | 2010-194557 A | 9/2010 |
| JP | 5071144 B2 | 11/2012 |
| JP | 5573973 B2 | 1/2013 |
| JP | 6046954 B2 | 2/2013 |
| JP | 2013166159 A | 8/2013 |
| JP | 5326757 B2 | 10/2013 |
| JP | 5864446 B2 | 2/2016 |
| JP | 6201882 B2 | 9/2017 |
| JP | 6365752 B2 | 8/2018 |
| JP | 2020032429 A | 3/2020 |
| JP | 2020059039 A | 4/2020 |
| JP | 6909034 B2 | 7/2021 |
| JP | 2022-503795 A | 1/2022 |
| JP | 7148491 B2 | 10/2022 |
| KR | 10-0354387 B1 | 12/2002 |
| KR | 10-0772131 B1 | 11/2007 |
| KR | 20100113400 A | 10/2010 |
| KR | 20110003572 A | 1/2011 |
| KR | 20110019270 A | 2/2011 |
| KR | 20110088266 A | 8/2011 |
| KR | 10-1194097 B1 | 10/2012 |
| KR | 10-1230359 B1 | 2/2013 |
| KR | 20160128939 A | 11/2016 |
| KR | 20180044625 A | 5/2018 |
| KR | 2021113973 | 9/2019 |
| KR | 20210049085 A | 9/2019 |
| KR | 10-2101364 B1 | 4/2020 |
| KR | 20200087172 A | 7/2020 |
| KR | 20210010980 A | 1/2021 |
| KR | 10-2273514 B1 | 6/2021 |
| KR | 20210130704 A | 10/2021 |
| KR | 20230069412 A | 5/2023 |
| KR | 20230134143 A | 9/2023 |
| KR | 10-2595360 B1 | 10/2023 |
| TW | 1688451 B | 3/2020 |
| WO | WO 1998/051441 A1 | 11/1998 |
| WO | WO 2000/020146 A1 | 4/2000 |
| WO | WO 2007/102540 A1 | 9/2007 |
| WO | WO 2009/127981 A2 | 10/2009 |
| WO | WO 2009/142070 A1 | 11/2009 |
| WO | WO 2011/017752 A1 | 2/2011 |
| WO | WO 2012/065616 A1 | 5/2012 |
| WO | WO 2012/141442 A2 | 10/2012 |
| WO | WO 2013/076884 A1 | 5/2013 |
| WO | WO 2014/057948 A1 | 4/2014 |
| WO | WO 2014/178731 A2 | 11/2014 |
| WO | WO 2015/060007 A1 | 4/2015 |
| WO | WO 2015/198910 A1 | 12/2015 |
| WO | WO 2016/072211 A1 | 5/2016 |
| WO | WO 2016/106179 A1 | 6/2016 |
| WO | WO 2016/111279 A1 | 7/2016 |
| WO | WO 2017/075396 A1 | 5/2017 |
| WO | WO 2019/089764 A1 | 5/2019 |
| WO | WO 2019/099928 A2 | 5/2019 |
| WO | WO 2019/115968 A1 | 6/2019 |
| WO | WO 2019/172300 A1 | 9/2019 |
| WO | WO 2019/178138 A2 | 9/2019 |
| WO | WO 2019/178138 A3 | 9/2019 |
| WO | WO 2019/198290 A1 | 10/2019 |
| WO | WO 2019/246251 A2 | 12/2019 |
| WO | WO 2019/246251 A3 | 12/2019 |
| WO | WO 2019/246251 A9 | 12/2019 |
| WO | WO 2020/015228 A1 | 1/2020 |
| WO | WO 2020/055989 A1 | 3/2020 |
| WO | WO 2020/106952 A1 | 5/2020 |
| WO | WO 2020/201299 A1 | 10/2020 |
| WO | WO 2021/030693 A2 | 2/2021 |
| WO | WO 2021/054894 A1 | 3/2021 |
| WO | WO 2021/067978 A1 | 4/2021 |
| WO | WO 2021/165545 A1 | 8/2021 |
| WO | WO 2022032061 A1 | 2/2022 |
| WO | WO 2022/159278 A1 | 7/2022 |
| WO | WO 2022/231423 A1 | 11/2022 |
| WO | WO 2023/006180 A1 | 2/2023 |
| WO | WO 2023/087631 A1 | 5/2023 |
| WO | WO 2023/099872 A1 | 6/2023 |
| WO | WO 2024/078248 A1 | 4/2024 |

OTHER PUBLICATIONS

Stationary Shoulder Friction Stir Welding, TWI-Global.com, 2 pages, date accessed Nov. 5, 2024.

Das, S. et al., "Selective Laser Sintering of High Performance High Temperature Materials", Laboratory for Freeform Fabrication, University of Texas at Austin, 1996, pp. 89-96.

Grätzel, M., "Advances in friction stir welding by separate control of shoulder and probe", Welding in the World (2021) 54:1931-1941.

Ohashi, T. et al., "Fastenerless-Riveting Utilizing Friction Stir Forming for Dissimilar Materials Joining", Key Engineering Materials, Aug. 2017, ISSN: 1662-9795, vol. 751, pp. 186-191, doi: 10.4028/www.scientific.net/KEM.751.186.

Miedzinski Mattias, "Materials for Additive Manufacturing by Direct Energy Deposition", Chalmers University of Technology Master's Thesis in Materials Engineering, 2017, http://publications.lib.chalmers.se/records/fulltext/253822/253822.pdf.

Mahmood, M, et al. "Metal Matrix Composites Synthesized by Laser-Melting Deposition: A Review", MDPI.com/journal/materials-Materials, 2020, vol. 13, 02593. https://www.mdpi.com/1996-1944/13/11/2593.

Davis, "Theoretical Analysis of Transpiration Cooling of a Liquid Rocket Thrust Chamber Wall", 2006, Theses—Embry-Riddle Aeronautical University, Daytona Beach, Florida, 103 pages.

Luo et al. Effects of Coolants of Double Layer Transpiration Cooling System in the Leading Edge of a Hypersonic Vehicle, Frontiers in Energy Research www.frontiersin.org, Sep. 9, 2021, vol. 9, Article 756820, https://www.frontiersin.org/articles/10.3389/fenrg.2021.756820/full.

Ohashi, T. et al., "Pseudo linear joining for dissimilar materials utilizing punching and Friction Stir Forming", Procedia Manufacturing, 2020, vol. 50, pp. 98-103.

Cold Spray Additive Manufactured Combustion Chamber, Impact Innovations GmbH, https://impact-innovations.com/en/applications/combustion-chamber/, 4 pages, Jun. 24, 2023.

Russell et al. "Performance Improvement of Friction Stir Welds by Better Surface Finish", George C. Marshall Space Flight Center Research and Technology Report 2014, 2 Pages, Jan. 1, 2015.

Wagner, J. et al. "Method for Fabricating Metallic Panels with Deep Stiffener Sections" https://www.techbriefs.com/component/content/article/23860-lar-17976-1, Feb. 1, 2016, 5 pages.

Carter, RW et al. "Robotic Manufacturing of 18 ft. (5.5mm) Diameter Cryogenic Fuel Tank Dome Assemblies for the NASA Ares I Rocket", TWI 9th International Symposium on Friction Stir Welding 2012, May 15, 2012, 25 pages.

Zhao et al. "Interfacial Bonding Features of Friction Stir Additive Manufactured Build for 2195-T8 Aluminum-Lithium Alloy" Journal of Manufacturing Processes 38, Jan. 2019, 15 pages.

Li et al, "Cold Spray+ as New Hybrid Additive Manufacturing Technology: A Literature Review" Science and Technology of Welding and Joining, 24(5), Apr. 15, 2019, pp. 420-445.

Khodabakhshi et al., "Surface Modification of a Cold Gas Dynamic Spray-deposited Titanium Coating on Aluminum Alloy by Using Friction-Stir Processing" Journal of Thermal Spray Technology, vol. 28, Aug. 2019, pp. 1185-1198.

Wang et al. "High Performance Bulk Pure Al Prepared Through Cold Spray-friction Stir Processing Compositive Additive Manufacturing" Journal of Materials Research and Technology, 9(4), Jun. 2020, pp. 9073-9079.

Hassan et al. "A Comprehensive Review of Friction Stir Additive Manufacturing (FSAM) of Non-Ferrous Alloys" Materials 16(7): 2723, Mar. 2023, 31 pages.

(56)  References Cited

OTHER PUBLICATIONS

Zhao et al. "Influence of Tool Shape and Process on Formation and Defects of Friction Stir Additive Manufactured Build" Journal of Materials Engineering, vol. 47 Issue 9, Sep. 2019, pp. 84-92.

Saju, T. P. et al., "Joining dissimilar grade aluminum alloy sheets using multi-hole dieless friction stir riveting process", The International Journal of Advanced Manufacturing Technology, 2021, 112: 285-302.

Rezaeinajad, SS et al., "Solid-State Additive Manufacturing of AA6060 Employing Friction Screw Extrusion", JOM 75: 4199-4211, Aug. 17, 2023, 13 pages.

* cited by examiner

WIRE-FEED FRICTION STIR ADDITIVE MANUFACTURING DEVICES AND METHODS

BACKGROUND

Field

The technology relates generally to wire-feed friction stir additive manufacturing (FSAM) systems, such as systems that feed wires through channels extending through a length of a rotating spindle.

Description of the Related Art

FSAM systems typically include a rotating shoulder or spindle having a single channel extending through a central longitudinal axis. Material is received in a receiving end of the single channel and softened within the single channel as it travels to a deposition end. The material then exits the deposition end in a softened state. The use of a single channel can limit the material to be deposited to a single material or a material of a single size (for example, a wire of a single diameter).

SUMMARY

The embodiments disclosed herein each have several aspects no single one of which is solely responsible for the present disclosure's desirable attributes. Without limiting the scope of the present disclosure, its more prominent features will now be briefly discussed. After considering this discussion, and particularly after reading the section entitled "Detailed Description" one will understand how the features of the embodiments described herein provide advantages over existing FSAM systems.

In one aspect, a friction stir additive manufacturing system includes a spindle, a plurality of sleeves, a plurality of wires, and a feeding system. The spindle is configured to rotate about a central axis. The spindle includes a plurality of spindle channels extending from a first end of the spindle to a second end of the spindle. Each of the plurality of sleeves are configured to be received within a corresponding channel of the plurality of spindle channels. Each of the sleeves includes a hollow interior. The feeding system is configured to feed each of the plurality of wires through a respective sleeve of the plurality of sleeves as the spindle rotates. The plurality of wires are configured to soften as they are fed through the plurality of sleeves and the spindle rotates.

In some embodiments, the feeding system is aligned with the central axis of the spindle and is configured to rotate about the central axis of the spindle as the spindle rotates. In some embodiments, a portion of at least one of the plurality of sleeves curves inward and toward the central axis of the spindle. In some embodiments, the feeding system includes a guide having a plurality of guide channels positioned in a linear array. Each of the guide channels are configured to receive a wire of the plurality of wires. In some embodiments, the linear array of guide channels has a length that exceeds a diameter of the spindle. In some embodiments, the guide includes a first portion having a first plurality of rollers configured to rotate about a first roller axis. The guide further includes a second portion having a second plurality of rollers configured to rotate about a second roller axis generally parallel to the first roller axis. The plurality of guide channels are arranged between the first plurality of rollers and the second plurality of rollers. In some embodiments, the feeding system includes a motor configured to rotate the first portion and the second portion to drive each of the plurality of wires through the respective sleeves. In some embodiments, the linear array of guide channels has a length that is less than a dimeter of the spindle. In some embodiments, a first sleeve of the plurality of sleeves has a first inner diameter and a second sleeve of the plurality of sleeves has a second inner diameter that is different than the first inner diameter. An exterior diameter of the first sleeve of the plurality of sleeves is the same as an exterior diameter of the second sleeve of the plurality of sleeves.

In another aspect, a friction stir additive manufacturing system includes a spindle, a plurality of wires, and a feeding system. The spindle is configured to rotate about a central axis. The spindle includes a plurality of spindle channels extending from a first end of the spindle to a second end of the spindle. The feeding system is configured to feed each of the plurality of wires through a respective spindle channel of the plurality of spindle channels as the spindle rotates. The plurality of wires are configured to soften as they are fed through the spindle channels and the spindle rotates. The feeding system includes a guide and a motor. The guide has a plurality of guide channels positioned in a linear array. Each guide channel is configured to receive a wire of the plurality of wires and guide the wire through a spindle channel of the plurality of spindle channels. The motor is configured to rotate the guide to drive the plurality of wires through the respective spindle channels.

In some embodiments, the guide includes a first portion having a first plurality of rollers configured to rotate about a first roller axis. The guide further includes a second portion having a second plurality of rollers configured to rotate about a second roller axis generally parallel to the first roller axis. The plurality of guide channels are arranged between the first plurality of rollers and the second plurality of rollers. In some embodiments, the system further includes a plurality of sleeves. Each of the plurality of sleeves are configured to be received within a corresponding channel from the plurality of spindle channels. Each of the sleeves including a hollow interior configured to receive a wire of the plurality of wires. In some embodiments, a portion of at least one of the plurality of sleeves curves inward and toward the central axis of the spindle. In some embodiments, a first sleeve of the plurality of sleeves has a first inner diameter and a second sleeve of the plurality of sleeves has a second inner diameter that is different than the first inner diameter. An exterior diameter of the first sleeve of the plurality of sleeves is the same as an exterior diameter of the second sleeve of the plurality of sleeves. In some embodiments, the linear array of the guide channels has a length that exceeds a diameter of the spindle. In some embodiments, the linear array of guide channels has a length that is less than a diameter of the spindle.

In another aspect, a method includes feeding a plurality of wires through a plurality of sleeves. Each sleeve including a hollow interior configured to receive a wire of the plurality of wires. Each sleeve at least partially disposed within a spindle channel extending through a spindle of a friction stir additive manufacturing device. The method also includes rotating the spindle about a central axis to soften the plurality of wires as they are fed through the plurality of sleeves to a deposition end of the spindle. The method also includes depositing softened material on a substrate as it exits the deposition end of the spindle.

In some embodiments, the method includes advancing the friction stir additive manufacturing device across the substrate as the softened material is deposited. In some embodiments, the method includes rotating a guide comprising a plurality of rollers. Two rollers of the plurality of rollers are configured to partially surround a portion of a wire of the plurality of wires prior to feeding the wire through the respective sleeve. In some embodiments, the method includes rotating the guide about the central axis of the spindle while simultaneously rotating the spindle about the longitudinal axis.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through use of the accompanying drawings. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. In some drawings, various structures according to embodiments of the present disclosure are schematically shown. However, the drawings are not necessarily drawn to scale, and some features may be enlarged while some features may be omitted for the sake of clarity. The relative dimensions and proportions as shown are not intended to limit the present disclosure. It will be readily understood that the aspects of the present disclosure, as generally described herein, and illustrated in the figures, can be arranged, substituted, combined, and designed in a wide variety of different configurations, all of which are explicitly contemplated and make part of the present disclosure.

DETAILED DESCRIPTION

Figure 1:
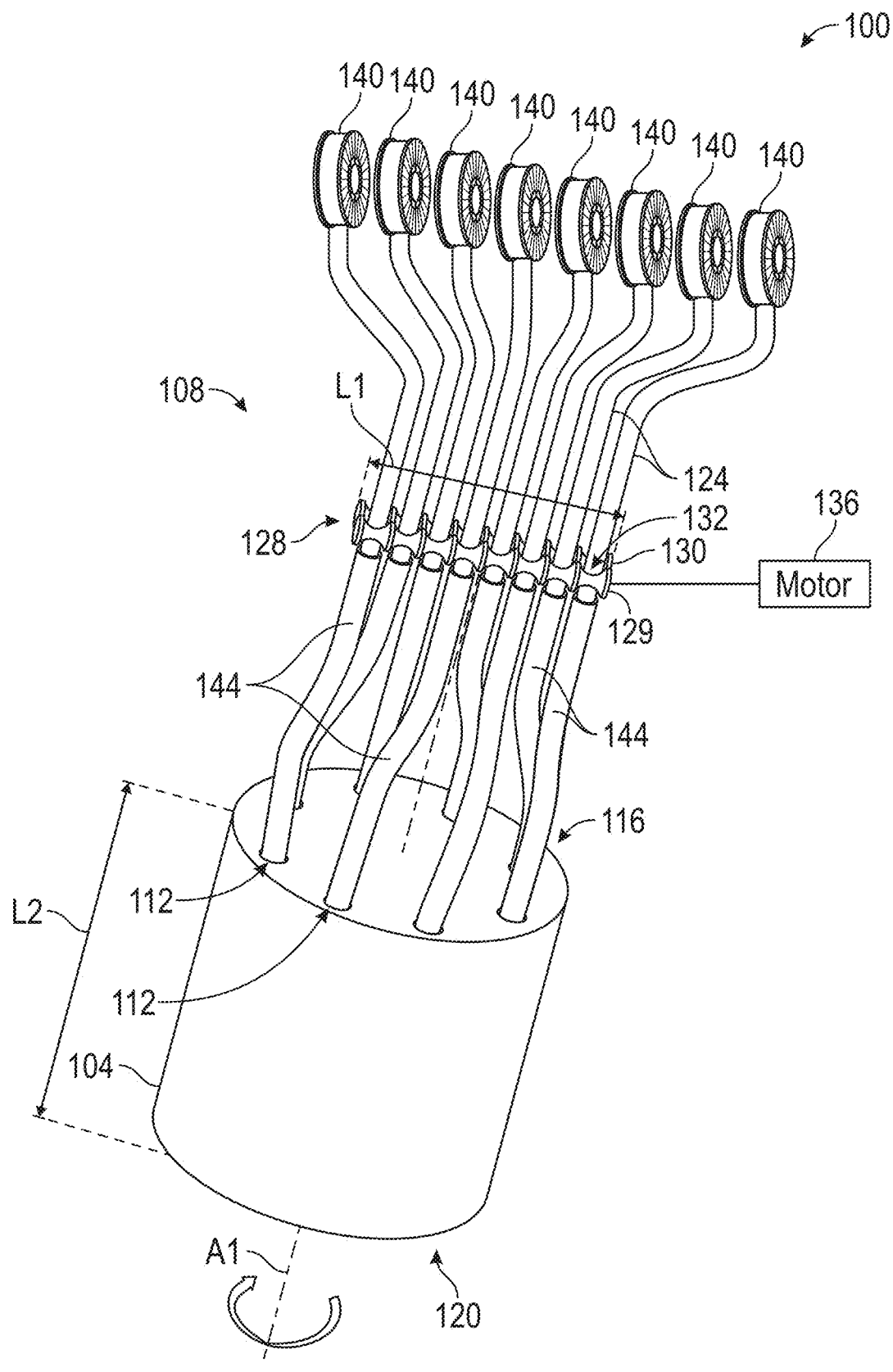
FIG. 1 is a perspective view of a wire-feed FSAM system having a plurality of wires fed through channels of a rotating spindle according to an embodiment of the present disclosure.

Embodiments of the present disclosure generally relate to FSAM devices and systems, specifically wire-feed FSAM devices, systems, and related methods. In some instances, the wire-feed FSAM devices include a rotating spindle with a plurality of spindle channels extending through a length of the rotating spindle. A wire can be fed simultaneously through one or more of the spindle channels, as the spindle is rotating. The wire can be a metal or metal matrix composite. In some instances, a first type of wire can be fed through a first spindle channel and a second, different type of wire can be fed through a second spindle channel. In some instances, the wire can be fed through a sleeve that is positioned within the spindle channel. The plurality of spindle channels can each have the same or different diameter, thus allowing wires of different sizes to be fed through the rotating spindle. In some instances, the wire can be fed through a guide. The guide can assist in guiding the wire through the spindle channel and/or the sleeve.

The devices, systems, and methods described herein may provide a number of advantages. Systems according to the present disclosure can be compact in size relative to prior bar-fed additive manufacturing systems, which can make the system easy to control. For example, bar-fed additive manufacturing systems can weigh about 3,000 lbs. In contrast, systems according to the present disclosure can weigh less than about 500 lbs. Systems according to the present disclosure can be more energy efficient than other FSAM systems. For example, the systems and methods described herein can soften or plasticize the material without the need to melt the material. This can reduce overall energy consumption. The systems can allow for the building of large metallic structures using a process that combines different materials together with a seamless transition between materials. For example, the incorporation of a plurality of spindle channels in a single rotating spindle can allow for multiple types of wire to be fed through the spindle simultaneously. Additionally, the spindle channels can have diameters of different sizes which can allow for wire of varying gauges to be fed through the same spindle. The use of sleeves to receive the wire can be beneficial in that the sleeves can help stabilize the wire under compression loading and prevent buckling of the wire during the feeding process. Further, the design of the system can support a large window of operation by adjusting the spacing, location, and number of wires fed through the spindle. For example, the number of wires fed through the spindle can be predetermined based on the desired feed rate. When manufacturing smaller parts, a reduced number of wires can be fed through the spindle. In one non-limiting embodiment, two wires are fed through the spindle during manufacture of relatively smaller parts. In contrast, when manufacturing larger parts, an increased number of wires can be fed through the spindle. In another non-limiting embodiment, twelve wires are fed through the spindle during manufacture of relatively larger parts. Accordingly, not all spindle channels may be used during operation of the system.

Various example embodiments of devices, systems, and methods according to the present disclosure will now be described with reference to the figures. FIG. 1 is a perspective view of an example wire-feed FSAM system 100 according to the present disclosure. The wire-feed FSAM system 100 can include a spindle 104 and a feeding system 108. The wire-feed FSAM system 100 can be used to deposit a softened material to a deposition zone. For example, the softened material can be a wire that has passed through and softened by interaction with the spindle 104. The wire can be a thread or rod. The wire can be solid or hollow. The wire can be a metal wire. The deposition zone can include the area where the softened material exits the wire-feed FSAM system 100 and/or the area where the softened material contacts a surface. The deposition zone can move as the wire-feed FSAM system 100 is moved across the surface. The deposition zone can be an area between the wire-feed FSAM system 100 and the surface. The deposition zone can include the area where the softened material is deposited.

The spindle 104 includes one or more spindle channels 112. Wires can be pushed through the one or more spindle channels 112 by the feeding system 108. In embodiments of the present disclosure, the spindle 104 includes a plurality of spindle channels 112, for example, 2, 3, 4, 5, 6, 7, 8, 9, 10 or more, 15 or more, or 20 or more spindle channels 112. The spindle 104 can be configured to rotate about a central axis A1 extending through the center of the spindle 104. As the spindle 104 rotates, the feeding system 108 can push the wires down through the spindle channels 112. Friction between the wires and the walls of the spindle channels 112 can soften the material forming the wire. The softened material exits the spindle 104 and can be deposited at the deposition zone.

The spindle 104 can be configured to move across the surface of a substrate. In one example, the spindle 104 moves in a transverse direction relative the substrate. For example, the direction of movement of the spindle 104 can be generally parallel to the substrate. As the spindle is being moved across the surface of the substrate, the softened material can continue to be deposited to the deposition zone. The movement of the spindle 104 and the deposition of the softened material can form a structure or part. Alternatively, the substrate can be moved relative to the spindle 104, and the spindle 104 can remain stationary to form a structure or part.

Figures 2, 3:
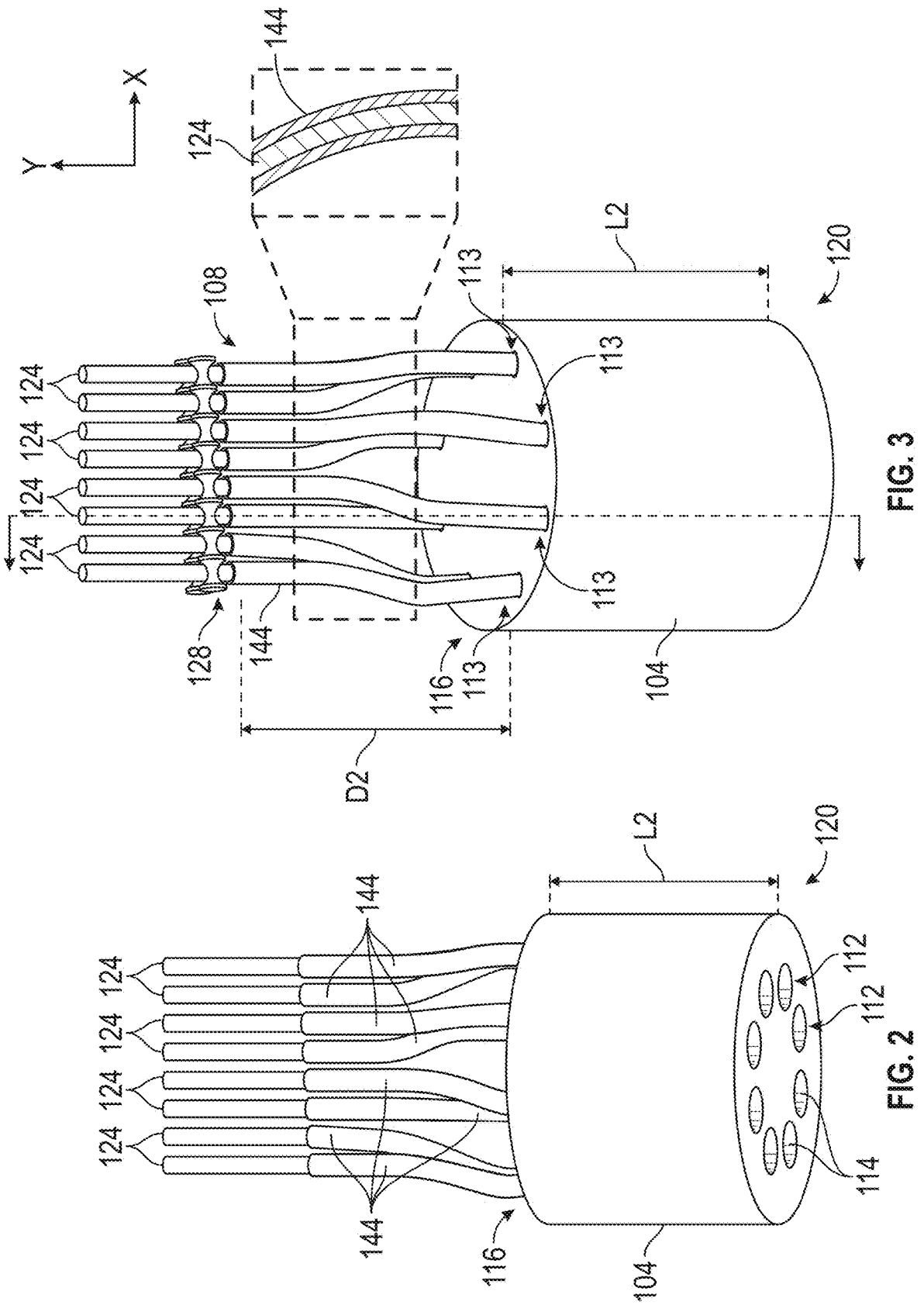
FIG. 2 is a bottom perspective view of the wire-feed FSAM system of FIG. 1 according to an embodiment of the present disclosure.
FIG. 3 is a top perspective view of the wire-feed FSAM system of FIG. 1 according to an embodiment of the present disclosure.
Figure 4:
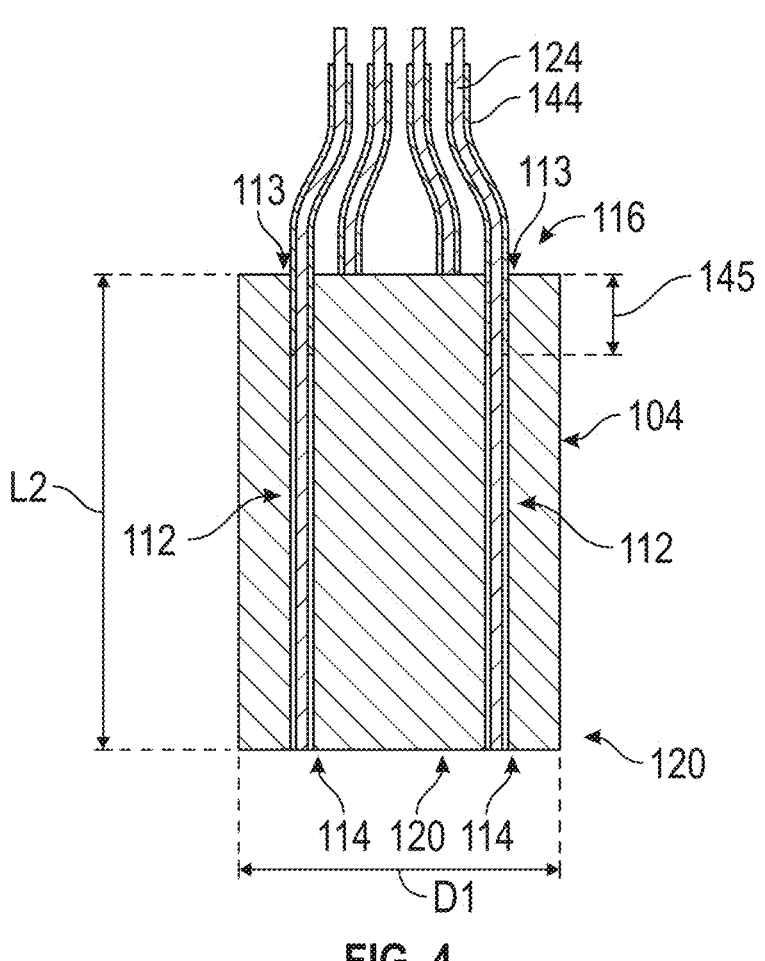
FIG. 4 is a cross-sectional view of the wire-feed FSAM system of FIG. 1 according to an embodiment of the present disclosure.

The plurality of spindle channels 112 can extend from a receiving end 116 of the spindle 104, through the spindle 104, to a deposition end 120 of the spindle 104. The spindle channels 112 can extend through a length L2 of the spindle 104. Openings 114 of the spindle channels 112 at the deposition end 120 of the spindle 104 are shown in FIG. 2. Openings 113 of the spindle channels 112 at the receiving end 116 of the spindle 104 are shown in FIG. 3. The spindle channels 112 can extend the entire length L2 of the spindle as shown in FIG. 4. For example, the spindle channels 112 can extend from the receiving end 116 to the deposition end 120. The openings 114 can define a first end of the spindle channels 112 and the openings 113 can define a second end of the spindle channels 112. The spindle channels 112 can be uniformly spaced about the spindle 104. The spindle channels 112 can be circumferentially spaced about the spindle 104. The spindle channels 112 can be non-uniformly spaced about the spindle 104. The spindle channels 112 can be positioned closer to an outer perimeter of the spindle 104 than the central axis A1 of the spindle 104. The spindle channels 112 can be spaced a predetermined distance from the central axis A1. The spindle channels 112 can have a cross-section that generally corresponds to the cross-sectional shape of wire that is fed through the channels. In some embodiments, the spindle channels 112 can have a circular, elliptical, or polygonal cross-sectional shape.

A spindle channel 112 of the plurality of spindle channels 112 can have the same or different cross-sectional shape as other spindle channels 112. For example, a first spindle channel 112 can have a circular cross-sectional shape while a second spindle channel 112 can have an elliptical shape, or the first spindle channel 112 can have a circular cross-sectional shape and the second spindle channel 112 can have a polygonal cross-sectional shape. In some embodiments, all spindle channels 112 can have the same diameter. In some embodiments, all, some, or one of spindle channels 112 can have a unique or different diameter. In some embodiments, a first set of spindle channels 112 can have a first diameter and a second set of spindle channels 112 can have a second diameter that is different than the first diameter. The diameter of a spindle channel 112 can affect the size of a wire that is configured to be fed through the spindle channel 112. The diameter of a spindle channel 112 can be 0.125 inches, 0.150 inches, 0.175 inches, 0.200 inches, 0.225 inches, 0.250 inches, or less or more, or any value or range defined by any of the preceding values.

Material can be fed to the spindle channels 112 of the spindle 104. The feeding system 108 can feed the material to the spindle channels 112, as illustrated in the non-limiting examples shown in FIGS. 1 and 3. The feeding system 108 can be configured to feed wire 124 through the spindle channels 112. The feeding system 108 can be driven by a motor 136 as shown in FIG. 1. In some embodiments, the motor 136 can be a servo motor. The feeding system 108 can include one or more spools 140 of the wire 124. The number of spools 140 can correspond to the number of spindle channels 112. The number of spools 140 can be less than the number of spindle channels 112. The number of spools 140 can be greater than the number of spindle channels 112. The spools 140 can be positioned in a linear array.

Each spool 140 can have a wire 124 of a selected material and/or diameter wrapped around the spool 140. The wire 124 can be a metal or metal matrix composite. The spools 140 selected for use may be dependent upon the type of material and the size or gauge of the wire 124. In some embodiments, the same wire 124 can be wrapped around each spool 140. In some embodiments, different wires 124 can be wrapped around each spool 140 or some of the spools 140. In some embodiments, a first wire 124 can be wrapped around a first spool 140 and a second wire 124 different than the first wire 124 can be wrapped around a second spool 140. The spools 140 can be selected based on the configuration of the spindle channels 112. For example, the size or diameter of the spindle channels 112 can aid in selecting a spool 140 wound with a type of wire 124 that is compatible with the spindle channel 112 that will receive the wire 124 being fed.

Figure 3A:
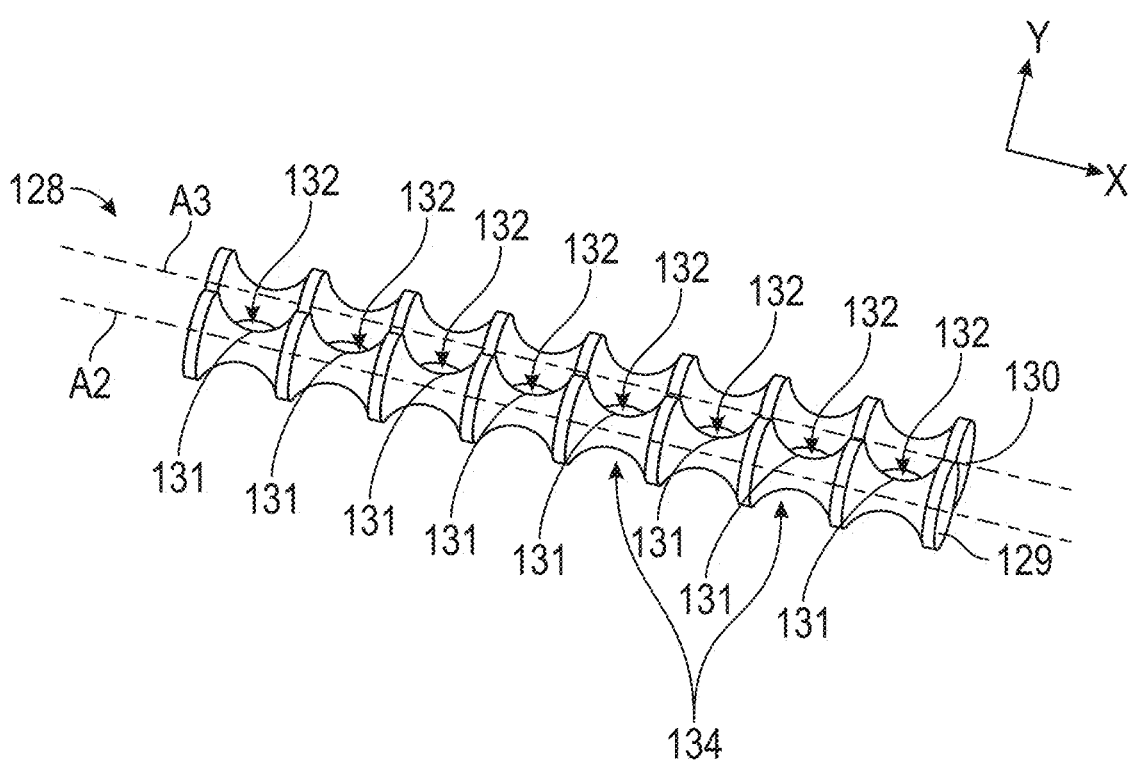
FIG. 3A is a perspective view of a guide of the wire-feed FSAM system of FIG. 1 according to an embodiment of the present disclosure.

In some embodiments of the present disclosure, the spools 140 can feed the wire 124 directly through the spindle channels 112 or through a structure received in the spindle channels 112, such as sleeves described in detail below. In some embodiments, the spools 140 can feed the wire 124 through a guide 128. The guide 128 can be spaced from the receiving end 116 of the spindle 104 along the Y-axis as shown in FIG. 3. In some embodiments, the guide 128 can be spaced from a receiving end of the sleeves along the Y-axis. The guide 128 can be spaced a distance D2 from the receiving end 116 of the spindle 104. In some embodiments, the distance D2 can be about ⅛ of an inch or less. In some embodiments, the guide 128 can be positioned adjacent to the receiving end of the sleeves along the Y-axis. The guide 128 can assist in guiding or feeding the wire 124 through the spindle channels 112. The guide 128 can include a plurality of guide channels 132. In embodiments in which the spindle 104 includes a plurality of spindle channels 112, the guide 128 can include a plurality of guide channels 132, as shown in FIGS. 1 and 3A. The guide channels 132 can be positioned in a linear array corresponding to the linear array of the spools 140. The guide channels 132 can be sized to receive the wire 124. In some embodiments, a length L1 of the linear array of the guide channels 132, as shown in FIG. 1, and/or the linear array of the spools 140 can exceed a diameter D1 of the spindle 104, as shown in FIG. 4. In some embodiments, the length L1 of the linear array of the guide channels and/or the linear array of the spools 140 can be the same or less than the diameter D1 of the spindle 104.

The guide 128 can include a first portion 129 and a second portion 130, as shown in FIGS. 1 and 3A. The first portion 129 and the second portion 130 can be identical structures. Each portion 129, 130 can define a section of each guide channel 132 when the first portion 129 and the second portion 130 are assembled. Each portion 129, 130 can extend along the X-axis, as shown in FIG. 3A, with a predetermined number of recesses 131 formed in the surface of each portion 129, 130, as shown in FIG. 3A, spaced along the X-axis. In some embodiments, the recesses 131 can be curved. A recess 131 from the first portion 129 can be positioned opposite a recess 131 from the second portion 130 when the portions 129, 130 are aligned, thereby forming one of the guide channels 132. For example, a recess 131 from the first portion 129 and a recess 131 from the second portion 130 can be aligned to form a guide channel 132. In some embodiments, the recesses 131 can extend around an outer surface of each portion 129, 130 such that as the first portion 129 and the second portion 130 rotate the size and shape of the guide channel 132 remains constant. The guide channels 132 can be spaced along the X-axis, as shown in FIG. 3A. In some embodiments, the wire 124 can be fed through the guide channels 132 after the first portion 129 and the second portion 130 are assembled. In some embodiments, the first portion 129 and the second portion 130 can be assembled around the wire 124. The guide 128 can prevent or reduce the risk that the multiple wires 124 twist, tangle, or intertwine as the wire 124 is fed through the spindle 104.

In some embodiments, each portion 129, 130 can be a single, monolithic structure that includes a plurality of rollers 134. The plurality of rollers 134 can be positioned along a central axis A2, A3 that extends through each portion 129, 130. The rollers 134 can partially surround the wires 124 fed between the rollers 134 of each portion 129, 130. Two rollers 134, one from each portion 129, 130 can partially surround a portion of the wire 124 fed between the two rollers 134. The rollers 134 can contact and apply a downward force to a wire 124 received in a guide channel 132 formed between the rollers 134. The rollers 134 can apply the downward force to the wire 124 as the portions 129, 130 are rotated about the respective axes A2, A3. In some embodiments, the portions 129, 130 can each rotate at a speed of 10 rpm, 30 rpm, 50 rpm, 70 rpm, 90 rpm, 110 rpm, 130 rpm, 150 rpm, or less or more, or any value or range defined by any of the preceding values. The portions 129, 130 can be rotated about the respective axes A2, A3 by the motor 136. The portions 129, 130 can be rotated in opposite directions. For example, when viewing the portions 129, 130 as oriented in FIG. 3A, the portion 129 can be rotated into the page and the portion 130 can be rotated out of the page. The opposing rotation of the opposing rollers 134 can work together to apply the downward force to the wire within the guide channel 132 formed by the rollers 134. The rotation of the rollers 134 can be configured such that the wires 124 are all fed at the same speed.

Figure 3B:
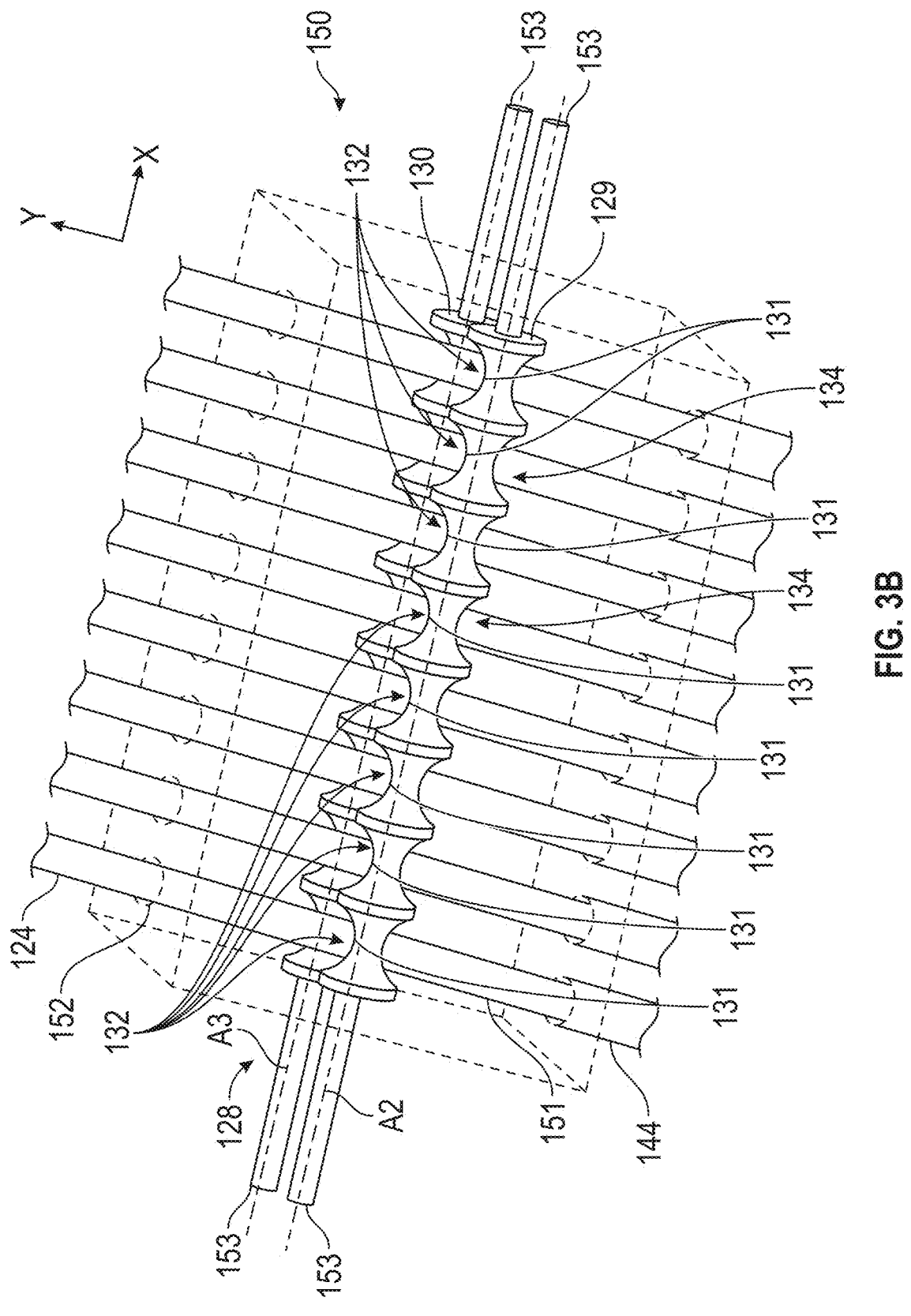
FIG. 3B is a perspective view of a guide and casing of the wire-feed FSAM system of FIG. 1 according to an embodiment of the present disclosure.

In some embodiments, the system 100 can include one or more sleeves 144, as shown in FIGS. 1-4. In embodiments in which the spindle 104 includes a plurality of spindle channels 112, the feeding system 108 can include a plurality of sleeves 144. In some embodiments, the sleeves 144 can be formed of stainless steel or a similar material. The sleeves 144 can have a hollow interior to receive the wire 124, as shown in FIG. 4. The sleeves 144 can be received in the spindle channels 112. The sleeves 144 can have a portion that is threaded. A portion of the sleeves 144 that extends into the spindle channels 112 can be threaded. The threaded portion of the sleeves 144 can be threaded into a threaded portion of the spindle channels 112 to form a threaded engagement 145. A portion of the spindle channels 112 at or near the receiving end 116 of the spindle 104 can be threaded. A length of the threaded engagement 145 can be about 0.25 inches, 0.50 inches, 0.75 inches, 1.0 inches, or less or more, or any value or range defined by any of the preceding values. A length of the portion of the sleeves 144 that is threaded may be about 0.25 inches, 0.50 inches, 0.75 inches, 1.0 inches, or less or more, or any value or range defined by any of the preceding values. A length of the portion of the spindle channels 112 that is threaded may be about 0.25 inches, 0.50 inches, 0.75 inches, 1.0 inches, or less or more, or any value or range defined by any of the preceding values. In some embodiments, the sleeves 144 may extend only partially into the spindle channels 112 such that the sleeves 144 do not extend past the threaded engagement 145. At least a portion of the sleeves 144 can extend out of the spindle channels 112 into an area above the receiving end 116 of the spindle 104. The portion of the sleeves 144 that extends out of the spindle channels 112 can be coupled with rollers. In some embodiments, the portion of the sleeves 144 can be coupled to a casing or housing 150 encompassing the rollers 134 as shown in FIG. 3B. The casing 150 can protect the rollers 134 during the feeding process from the outer environment. The sleeves 144 can be coupled with or extend into openings 151 of a first surface of the casing 150. The wires 124 can be fed into openings 152 of a second surface of the casing 150 and towards the guide channels 132. The rollers 134 can be coupled to axles 153 configured to rotate the rollers 134. The axles 153 can extend out of the casing 150. As the rollers 134 rotate, the wires 124 can be fed through the guide channels 132 and out the openings 151 and into the sleeves 144. In some embodiments, the portion of the sleeves 144 that extends out of the spindle channels 112 into an area above the receiving end 116 of the spindle 104 can include curved sections. The length L1, as shown in FIG. 1, or positioning of the guide 128 can affect the curvature of the curved sections. For example, if the length L1 of the guide 128 exceeds the diameter D1, as shown in FIG. 4, of the spindle 104, the sleeves 144 may include sections that curve outward and away from the central axis A1. If the length L1 of the guide 128 is less than the diameter D1 of the spindle 104, the sleeves 144 may include sections that curve inward and toward the central axis A1. The curved sections of the sleeves 144 may facilitate feeding of the wire 124. In some embodiments, the guide 128 may be positioned such that one or more of the sleeves 144 do not have a curved section.

In some embodiments, each sleeve 144 can have the same outer diameter. This can allow each of the spindle channels 112 to have a common diameter configured to receive any one of a plurality of sleeves 144. An inner diameter of each of a plurality of sleeves 144 can be selected so that the plurality of sleeves 144 in combination are configured to receive wire 124 of different gauges or diameters. Stated another way, the inner diameter of a first sleeve 144 can be different than an inner diameter of a second sleeve 144, while the outer diameter of the first sleeve 144 is the same as the outer diameter of the second sleeve 144. In some embodiments, the outer diameters of the sleeves 144 can vary depending on the size or diameters of the spindle channels 112. The outer diameter of the wire 124 can be about 5-10 percent less than the inner diameter of the respective sleeve 144.

Embodiments of the sleeves 144 according to the present disclosure can be configured to assist in feeding the wire 124 through the spindle channels 112. Advantageously, the sleeves 144 can also help stabilize the wire 124 under compression loading. The stabilization of the wire 124 can allow for easier feeding of the wire 124 into the spindle channels 112. Additionally, the sleeves 144 can help prevent or reduce occurrences of the wire 124 buckling while being fed through the spindle channels 112. The sleeves 144 may also be advantageous because they may prevent or reduce occurrences of multiples wires 124 becoming tangled or accidentally intertwined during the feeding process.

Figure 5:
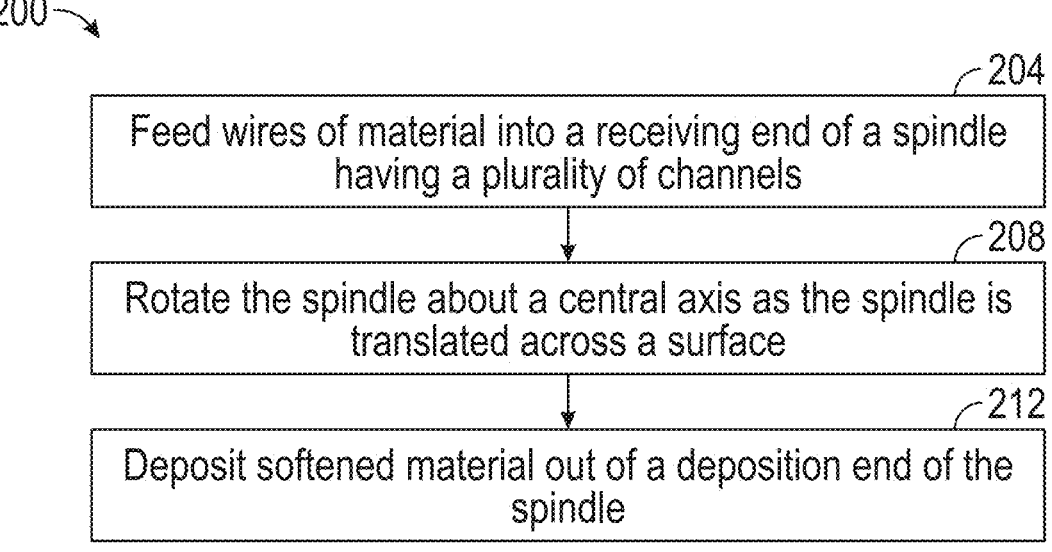
FIG. 5 is a flow chart representing an example method of operating a wire-feed FSAM system according to an embodiment of the present disclosure.

FIG. 5 is a flow chart representing an example method 200 of operating a wire-feed FSAM device according to an embodiment of the present disclosure. In one example implementation, the method 200 can be performed by any system according to the present disclosure, for example FSAM system 100 described above with reference to FIGS. 1-4. Although the method 200 will be described in the context of an FSAM system 100, it will be appreciated that the same or similar steps may be implemented in conjunction with another FSAM system without departing from the scope of the present disclosure. The method 200 begins at block 204, where wires (for example, wires 124) are fed into a receiving end of a spindle having a plurality of channels. In the non-limiting embodiment of FSAM system 100, for example, wire 124 can be fed into the receiving end 116 of the spindle 104 having a plurality of spindle channels 112. A single wire can be fed through a single channel of the spindle. The wire can be fed into an opening of the channel at the receiving end of the spindle. Multiple wires can be fed through the plurality of channels simultaneously. For example, a first wire can be fed through a first channel while a second wire is simultaneously fed through a second channel. In some embodiments, the spindle 104 can be rotating as the wires 124 are initially fed into the spindle channels 112. The spindle 104 can begin rotating before wires 124 enter the spindle channels 112. In some embodiments, the spindle 104 begins rotating after the wires 124 enter the spindle channels 112.

In some embodiments, the method 200 can include feeding the wires through sleeves received within the spindle channels. For example, in the context of FSAM system 100, wire 124 can be fed through sleeves 144 received within the spindle channels 112. The wires can be stored as spools (for example, spools 140). The wires can be pulled from the spools and fed into a guide (for example, guide 128). The guide can assist in guiding the wires through corresponding sleeves. The sleeves can assist in guiding the wires through the spindle.

Moving to block 208, the spindle can be rotated about a central axis (for example, central axis A1) as the spindle is translated across a surface, according to the present disclosure. As the spindle is rotated, the wire fed through the plurality of channels can soften. In some embodiments, the entire FSAM system can rotate with the spindle. For example, the spindle and the feeding system (for example, feeding system 108) can rotate about the central axis. Rotating components of the entire FSAM system together can prevent or reduce occurrences where the wires intertwine or tangle. In other embodiments, the spindle and a portion of the feeding system can rotate together about the central axis. For example, in the context of the FSAM system 100, the spindle 104 and the guide 128 can rotate about the central axis A1, while the spools 140 remain stationary relative to the spindle 104 (while still rotating about their respective axes as wire is unspooled). The elements of the FSAM system may be positioned linearly along the central axis A1 of the spindle 104. The positioning of the FSAM system along the central axis can allow portions of or the entire FSAM system to rotate together about the central axis of the spindle.

Moving to block 212, the softened material can exit a deposition end (for example, deposition end 120) of the spindle, according to the present disclosure. The deposition of the softened material can form structures, parts, joints, and welds. The softened material can be deposited in layers to form the structures, parts, joints, and welds.

In some embodiments, the method 200 can include advancing the FSAM system across a substrate or surface to deposit the softened material. Advancing the system can include moving the spindle in a direction generally perpendicular to the axis of rotation of the spindle, moving the spindle along a surface or a prior deposited layer of material, or moving the spindle generally parallel to the axis of rotation of the spindle. In some embodiments, the substrate, surface, or prior deposited layer of material can be moved relative to the FSAM system such that the FSAM system does not need to be advanced and can remain in a stationary location while the spindle rotates about the axis of rotation.

Figure 6C:
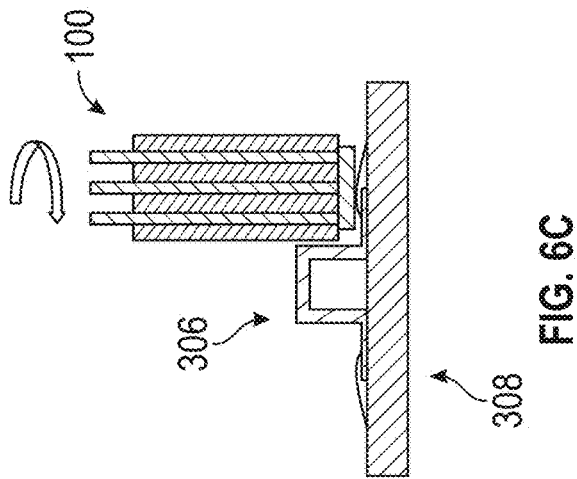
FIG. 6C illustrates a stiffener being joined to a workpiece using a wire-feed FSAM system according to an embodiment of the present disclosure.
Figure 6B:
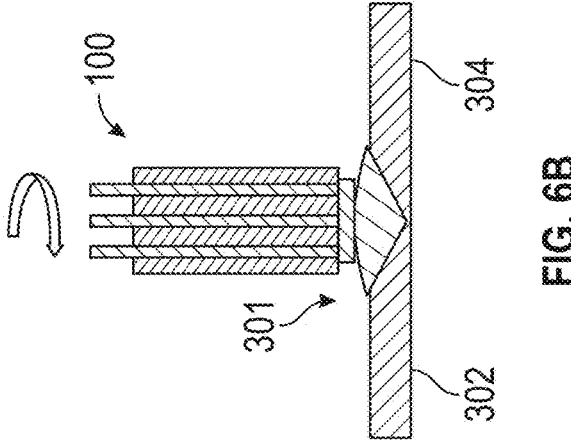
FIG. 6B illustrates a joint being formed between two workpieces using a wire-feed FSAM system according to an embodiment of the present disclosure.
Figure 6A:
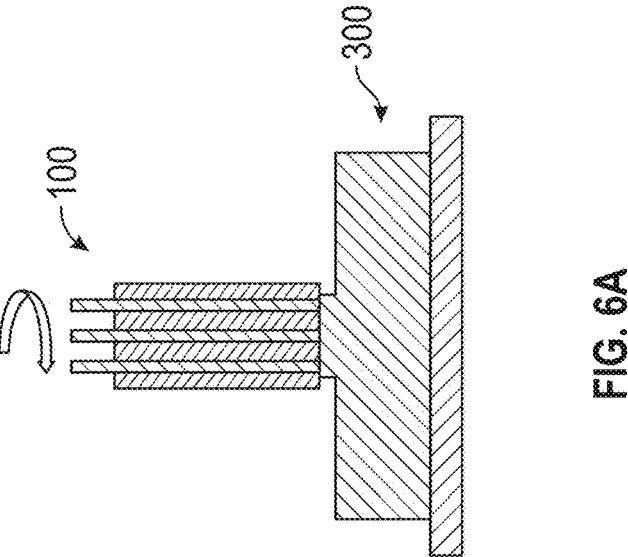
FIG. 6A illustrates a part or structure being formed using a wire-feed FSAM system according to an embodiment of the present disclosure.

FIGS. 6A-6C illustrate example applications of FSAM systems (for example, FSAM system 100) according to the present disclosure. FIG. 6A illustrates a part or structure 300 being formed using an FSAM system according to an embodiment of the present disclosure. FIG. 6B illustrates a joint 301 being formed between two workpieces 302, 304 using an FSAM system, according to an embodiment the present disclosure. FIG. 6C illustrates a stiffener 306 being joined to a workpiece 308 using an FSAM according to an embodiment of the present disclosure. Friction-induced heating of the wires softens the wires as they are fed through the spindle, allowing the material to be pushed and/or flow through the spindle to a deposition zone, according to the present disclosure. In some embodiments, the material can then harden to form a part, joint, or weld.

As described herein, FSAM systems and methods of use according to the present disclosure may provide numerous advantages and benefits. The plurality of spindle channels extending through a length of a single rotating spindle can allow for multiple types and sizes of wire to be fed through the spindle simultaneously. Additionally, the spindle channels can have diameters of different sizes which can allow for wire of varying gauges or diameters to be fed through the same spindle. The incorporation of sleeves can help stabilize the wire under compression loading when being fed through the system and prevent or reduce occurrences of the wire buckling during the feeding process. The sleeves can also help prevent tangling of multiple wires as they are fed through the spindle simultaneously.

While the above detailed description has shown, described, and pointed out novel features of the present disclosure as applied to various embodiments, it will be understood that various omissions, substitutions, and changes in the form and details of the device or process illustrated may be made by those skilled in the art without departing from the spirit of the present disclosure. As will be recognized, the present disclosure may be embodied within a form that does not provide all of the features and benefits set forth herein, as some features may be used or practiced separately from others. All changes which come within the meaning and range of equivalency of the claims are to be embraced within their scope.

The term "comprising" as used herein is synonymous with "including," "containing," or "characterized by," and is inclusive or open-ended and does not exclude additional, unrecited elements or method steps. With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All numbers expressing quantities, dimensions, and so forth used in the specification and claims are to be understood as being modified in all instances by the term "about." Accordingly, unless indicated to the contrary, the numerical parameters set forth in the specification are approximations that may vary depending upon the desired properties sought to be obtained by embodiments of the present disclosure. At the very least, and not as an attempt to limit the application of the doctrine of equivalents to the scope of the claims, each numerical parameter should be construed in light of the number of significant digits and ordinary rounding approaches. For example, terms such as about, approximately, substantially, and the like may represent a percentage relative deviation, in various embodiments, of ±1%, ±5%, ±10%, or ±20%.

The above description discloses several devices, methods, and materials of the present disclosure. The present disclosure is susceptible to modifications in the devices, methods, and materials, as well as alterations in the fabrication methods and equipment. Such modifications will become apparent to those skilled in the art from a consideration of this disclosure. Consequently, it is not intended that the present disclosure be limited to the specific embodiments disclosed herein, but that it covers all modifications and alternatives coming within the true scope and spirit of the present disclosure.

What is claimed is:

1. A friction stir additive manufacturing system comprising:
a spindle configured to rotate about a central axis, the spindle comprising a plurality of spindle channels extending from a first end of the spindle to a second end of the spindle;
a plurality of wires; and
a feeding system configured to feed each of the plurality of wires through a respective spindle channel of the plurality of spindle channels as the spindle rotates, the plurality of wires configured to soften as they are fed through the spindle channels and the spindle rotates, the feeding system comprising:
a guide having a plurality of guide channels positioned in a linear array, each guide channel configured to receive a wire of the plurality of wires and guide the wire through a spindle channel of the plurality of spindle channels, the guide comprising a first portion comprising a first plurality of rollers configured to rotate about a first roller axis, the guide further comprising a second portion comprising a second plurality of rollers configured to rotate about a second roller axis generally parallel to the first roller axis, the plurality of guide channels arranged between the first plurality of rollers and the second plurality of rollers, and
a motor configured to rotate the guide to drive the plurality of wires through the respective spindle channels.

2. The friction stir additive manufacturing system of claim 1, further comprising a plurality of sleeves, each of the plurality of sleeves configured to be received within a corresponding channel from the plurality of spindle channels, each of the sleeves comprising a hollow interior configured to receive a wire of the plurality of wires.

3. The friction stir additive manufacturing system of claim 2, wherein a portion of at least one of the plurality of sleeves curves inward and toward the central axis of the spindle.

4. The friction stir additive manufacturing system of claim 2, wherein a first sleeve of the plurality of sleeves has a first inner diameter and a second sleeve of the plurality of sleeves has a second inner diameter that is different than the first inner diameter, and wherein an exterior diameter of the first sleeve of the plurality of sleeves is the same as an exterior diameter of the second sleeve of the plurality of sleeves.

5. The friction stir additive manufacturing system of claim 1, wherein the linear array of the guide channels has a length that exceeds a diameter of the spindle.

6. The friction stir additive manufacturing system of claim 1, wherein the linear array of the guide channels has a length that is less than a diameter of the spindle.

\* \* \* \* \*